United States Patent [19]

Dubost

[11] Patent Number: 4,684,305

[45] Date of Patent: Aug. 4, 1987

[54] FASTENING CLIP DEVICE

[75] Inventor: Dominique Dubost, La Celle St. Cloud, France

[73] Assignee: Rapid S.A., France

[21] Appl. No.: 841,781

[22] Filed: Mar. 20, 1986

[30] Foreign Application Priority Data

Mar. 29, 1985 [FR] France ............................ 85 04844

[51] Int. Cl.⁴ ........................................... F16B 37/02
[52] U.S. Cl. .................................. 411/174; 411/520; 411/970
[58] Field of Search ............... 411/174, 175, 170, 172, 411/173, 520, 437, 427, 970

[56] References Cited

U.S. PATENT DOCUMENTS

| | | | |
|---|---|---|---|
| 2,581,481 | 1/1952 | Hartman | 411/175 |
| 3,145,753 | 8/1964 | Kreider | 411/970 X |
| 3,217,773 | 11/1965 | Munse | 411/175 |
| 3,229,743 | 1/1966 | Derby | 411/175 |
| 3,376,612 | 4/1968 | Munse | 411/437 X |
| 3,426,818 | 2/1969 | Derby | 411/175 |
| 3,881,203 | 5/1975 | Giulie | 11/1 R |
| 3,925,862 | 12/1975 | Youngblood, Jr. | 24/252 R |

FOREIGN PATENT DOCUMENTS

| | | | |
|---|---|---|---|
| 2617940 | 11/1977 | Fed. Rep. of Germany | 411/427 |
| 1194685 | 5/1959 | France | 411/520 |
| 2489903 | 3/1982 | France | . |
| 538540 | 8/1941 | United Kingdom | 411/427 |
| 546807 | 7/1942 | United Kingdom | 411/427 |

Primary Examiner—Gary L. Smith
Assistant Examiner—Adrian H. Whitcomb, Jr.
Attorney, Agent, or Firm—Steinberg & Raskin

[57] ABSTRACT

A fastening clip device forming a nut in the form of a resiliently deformable U section adapted to be fitted by its legs onto the edge of a panel, and having a member interposed between the legs so as to hold them positively apart prior to their fitting onto the edge of the panel and being movable relatively to the legs so as to be displaceable therebetween under the action of the panel as the legs are passed over the edge surfaces thereof. At the end of the fitting operation, one of the legs is released to allow the U section to resiliently close onto the edge of the panel.

14 Claims, 6 Drawing Figures

FASTENING CLIP DEVICE

BACKGROUND OF THE INVENTION

The present invention has essentially for a subject matter a fastening clip device which can be used for holding together any grouped objects, such as for example documents, or which can constitute a nut allowing, for example, fastening of a panel to another panel.

Clip attachments have already been known for a long time which are made of metal or of plastic and which are in the form of a substantially U-shaped, resiliently deformable element adapted to be fitted by its legs onto the edge of an object. But the placing of the clip on the object is often difficult to perform because its legs are initially preloaded in closed position and they therefore have to be moved apart to allow its fitting onto the object or objects. Consequently, if the thickness of the group of objects to be gripped is important, the clip legs must be moved apart to a great extent, which is an arduous operation during which the user of the clip even risks being injured. Moreover, when fitting the clip, its legs rubbing against the object may spoil it.

The same kinds of disadvantages are inherent in the fastening devices of the above kind constituting fastening nut devices.

Such devices are generally in the form of a U-shaped metal element with resiliently deformable legs which is fitted onto the edge of a panel and which allows fastening the same to another panel by means of a screw extending right through both panels and both legs of the U-shaped element and screwed into one of the legs. Also in this case, and as explained above, the mounting may be difficult to perform, especially where the nut has to be mounted on panels of great thickness, with the attendant risk of scratching of the panels. Moreover, if the mounting has to be performed on panels of soft material or of plastic material, the legs of the U-shaped nut element are likely to remove chips from the surface of the panel, which of course is undesirable. Lastly, such U-shaped nut attachments poorly withstand the pushing or compression stresses produced during the screwing, especially where the latter is performed by screwing machines. This results in deteriorating of the attachment and necessitating its replacement.

SUMMARY OF THE INVENTION

The device of the invention, whether consisting of a mere clip for holding together grouped objects,or of a nut clip, has for its purpose remedying particularly all the above drawbacks owing to the fact that it can be fitted easily and without effort onto the object or the panel, it can in no way deteriorate or spoil the object or panel, and yet, once fitted, exerts a satisfactory clamping force on the object or the panel.

To this end, the invention has for a subject matter a fastening clip device of the type substantially in the form of a resiliently deformable U-shaped element adapted to be fitted by its legs onto the edge of an object, characterized by a member which, on the one hand, is interposed between the two legs of the U-shaped element to hold them positively apart before its fitting onto the edge of the object, and which, on the other hand, is movable relatively to the said legs so as to be displaceable therebetween under the action of their fitting onto the object, at least one of the two legs being provided with means for releasing the legs at the end of the displacement of the member to allow their closing onto the edge of the object.

According to another feature of the device of the invention, the member is constituted by a portion slidable on one of the two legs of the U-shaped element and terminating in a bent portion on which the other leg bears.

Furthermore, one of the two legs of the U-shaped element may be provided with a partially stamped out and deformed plate portion integral with the free end of the leg, extending inwardly of the U-shaped element and resiliently bearing on the bent end of the aforesaid member.

According to another feature of the invention, the plate is provided with an opening allowing the screwing of a screw and constituted for example by an internally threaded barrel portion, whereas the other leg of the U-shaped portion, as also the aforesaid member portion slidable thereon, are each provided with an opening for the passage of the screw which also passes through a hole provided in the edge of the object constituting for example a panel, when the latter is in inserted position between the two legs of the U-shaped element.

According to still another feature of the device of the invention, there are provided, on either side of the opening of the said sliding member portion, tongues resulting from lanced portions of the said sliding portion and co-operating with the edge of the opening provided in the other leg of the U-shaped element.

Furthermore, the opening provided in the sliding portion of the member is provided with an edge projecting inwardly of the U-shaped element.

It should also be noted that the sliding portion is slightly curved and is provided with downwardly turned flanges co-operating with the sides of the other leg of the U-shaped element.

According to still another feature of the invention, the bent end of the member consists of a first portion substantially perpendicular to the sliding portion and parallel to the base of the U-shaped element, and which is followed by an end portion substantially parallel to the plate which bears thereon.

According to still another feature of the device of the invention, the end portion has a smaller length than the distance between the edge of the free end of the plate and the base of the U-shaped element.

Furthermore, the first portion of the bent end of the member may advantageously be provided with ribs ensuring the necessary stiffening.

BRIEF DESCRIPTION OF THE DRAWINGS

Other features and advantages of the invention will appear more clearly as the following detailed description proceeds with reference to the appended drawings given solely by way of example and wherein:

FIG. 4 is a perspective view of the complete nut in a position ready for mounting on the edge of a panel;

DESCRIPTION OF THE PREFERRED EMBODIMENTS

Figure 1:
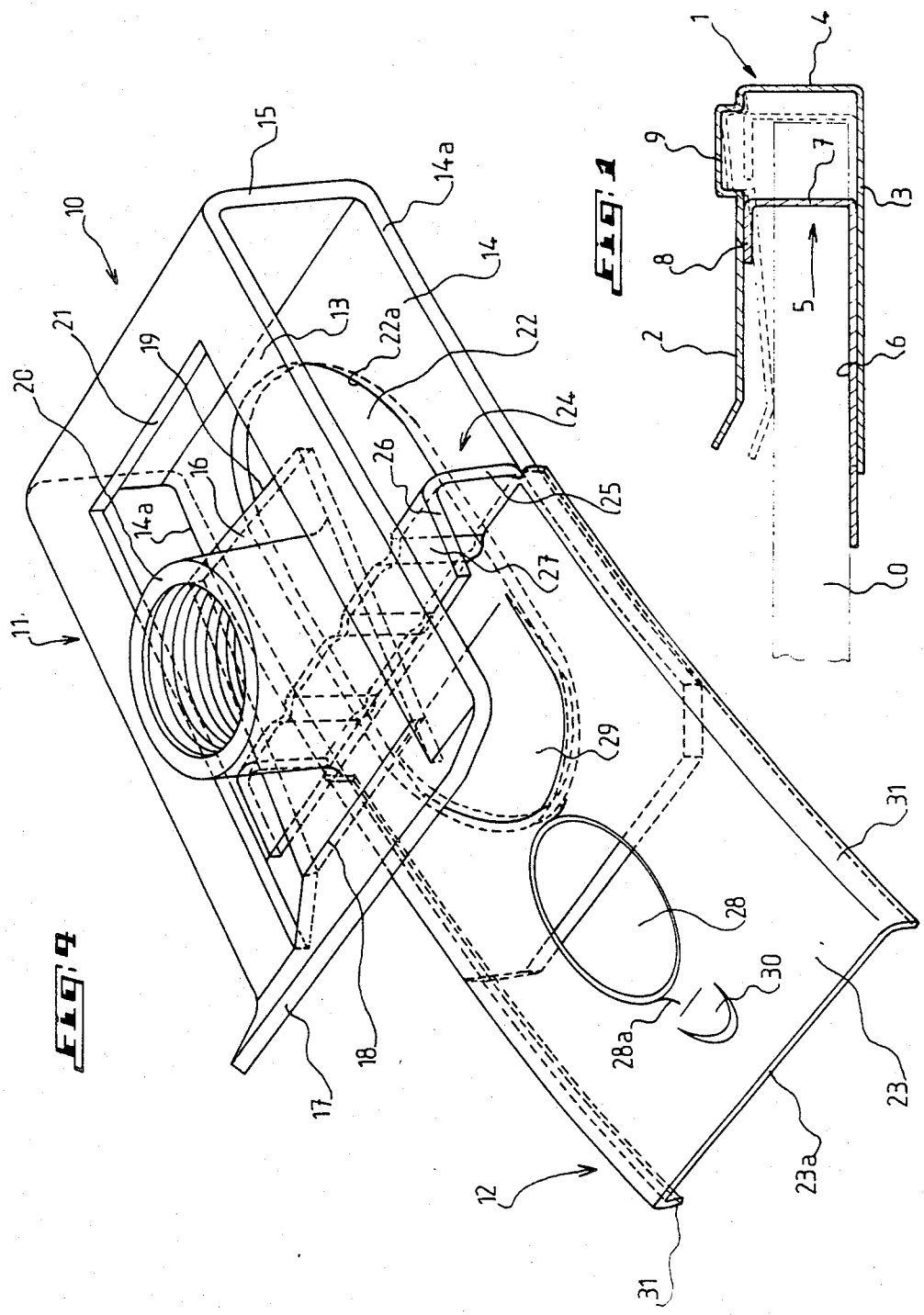
FIG. 1 is a diagrammatic elevational and sectional view of a clip device complying with the principles of the invention.

As seen in FIG. 1, a fastening clip device complying with the principles of the invention includes essentially a resiliently deformable U-shaped part 1 including two resilient legs 2 and 3 interconnected by a portion 4 forming the base of the U-shaped element. Between the legs 2 and 3 is interposed a member 5 which initially holds the legs 2 and 3 apart from one another so as to allow fitting without difficulty the U-shaped element 1 onto the edge of one or several objects such as 0.

More precisely, the element 5, which is movable relative to the part 1, is formed of a portion 6 adapted to slide on the leg 3 of the U-shaped part 1, and a bent end 7 on which the leg 2 rests or bears.

The device which has just been described and which includes the part 1 and the member 5 operates as follows.

Before mounting the clip device onto the object 0, its legs 2 and 3 are held apart by the member 5 so that the fitting of the clip device is performed easily onto the edge of the object 0 which may be constituted for example by a stack of documents or like papers. The user holding the U-shaped part 1 passes it over the edge of the object 0 until the said edge abuts against the bent end 7 of the member 5. From that time on, the push exerted on the part 1 causes it to slide on the member 5 immobilized by the edge of the object until the end portion 8 of the bent end 7 falls into a recessed portion 9 provided in the leg 2 in the vicinity of the base 4 of the U-shaped element. Consequently, the leg 2 is released and resiliently bears against the object 0 as shown by the dashed lines in FIG. 1. Thus, the part or clip 1 is in its final mounted position on the object 0.

It will be noted that the recessed portion 9 may be merely constituted by a hole provided in the leg 2 or by any other means capable of releasing the leg 2 initially held positively apart from the leg 3 by the member 5.

The principle of the clip device just described finds a particularly interesting application in nuts designed to be mounted on the edge of a panel, as will now be described in detail with reference to FIGS. 2 to 4.

Figure 2:
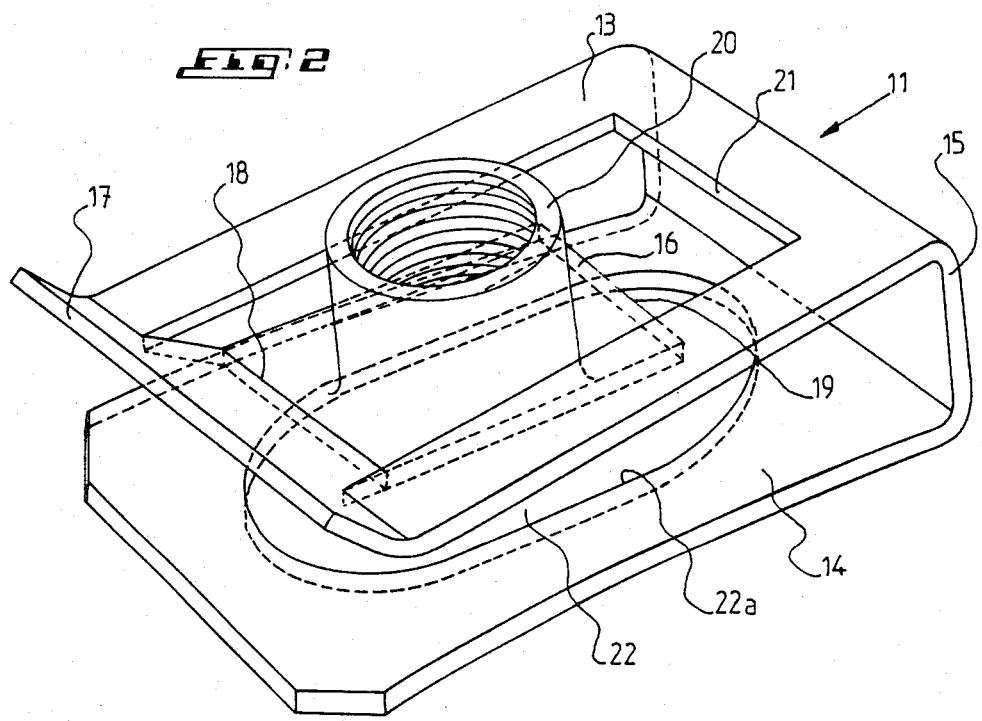
FIGS. 2 and 3 are perspective views of two essential portions of a nut clip device constituting one of the applications of the present invention.
Figure 3:
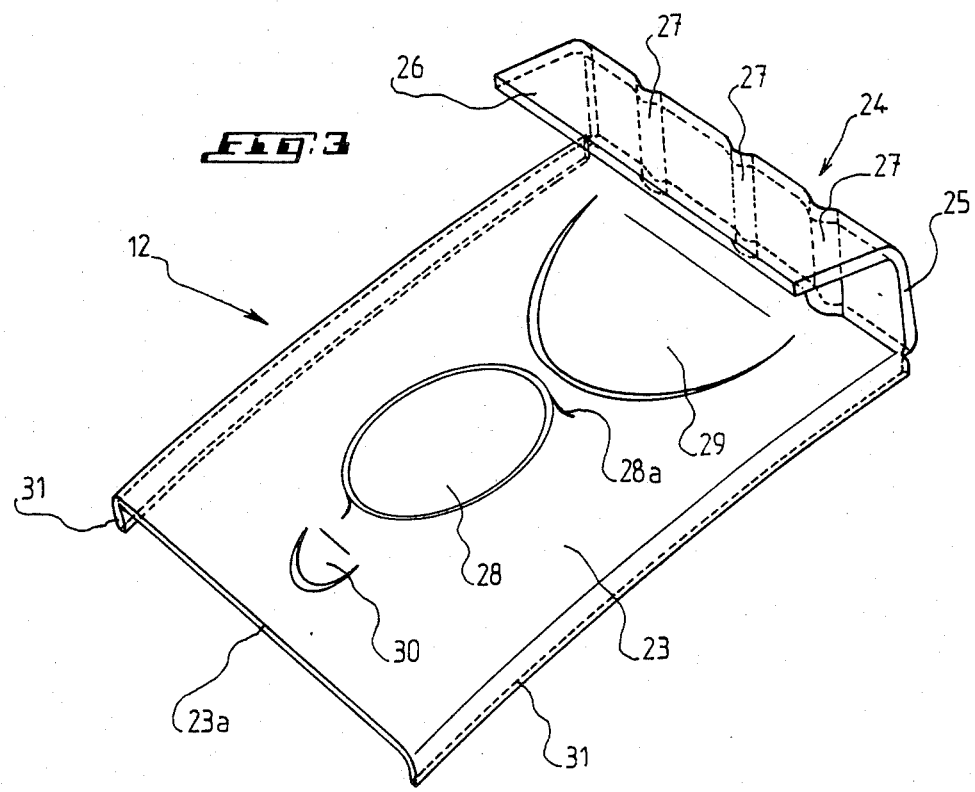

As seen in FIG. 4, the nut 10, preferably made from a sheet of spring steel, is in the general form of a resiliently deformable U-shaped element which is seen at 11 in FIG. 2 and within which is mounted a member 12 shown separately in FIG. 3.

The U-shaped element 11 includes a first or upper leg 13 and another or lower leg 14 interconnected by a portion 15 forming the base of the U-shaped element.

The leg 13 has a partially stamped out and deformed portion extending between the two legs 13 and 14 and forming a plate 16. According to the example illustrated, the plate 16 is integral with the free and upwardly bent end 17 of the leg 13 and is located slightly below the plane of the leg 13 as a result of a bend shown at 18. The free end edge 19 of the plate 16 is spaced a certain distance from the base 15 of the U-shaped element 11.

Figure 6:
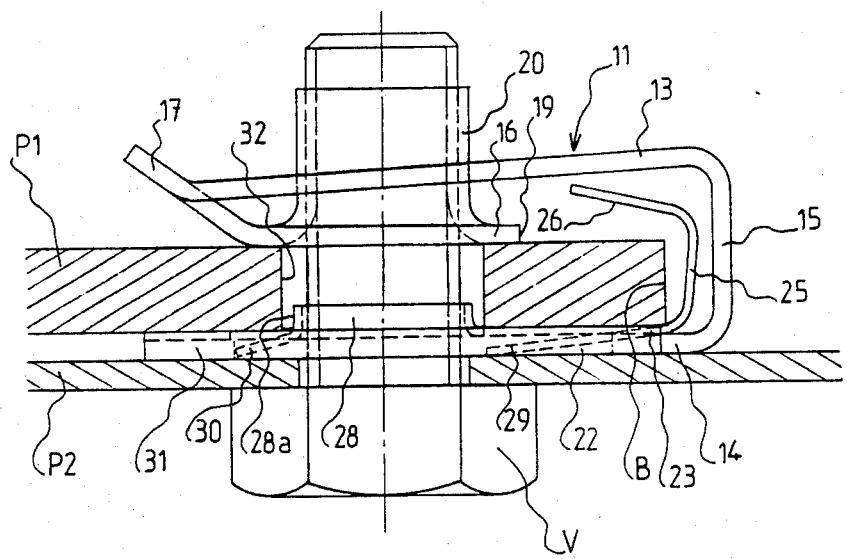
FIG. 6 is a side elevational and sectional view of an assembly of two panels using the nut previously introduced into one of the panels.

The plate 16 carries an upwardly extending, internally-threaded barrel portion 20 passing through the cut 21 made in the leg 13 to obtain the plate or tongue 16. The internally-threaded barrel 20 allows the screwing of a screw V clearly visible in FIG. 6, and it may quite as well, without departing from the scope of the invention, consist merely of a screwing opening or impression or more generally, by any appropriate means adapted to co-operate with the thread of a screw or any threaded element.

The lower leg 14 of the U-shaped element 11 is provided with an opening 22 which, as represented, is oblong in shape, but which may have any other shape provided that the opening allowing the passage of the screw V remains in alignment with the opening of the internally-threaded barrel 20 or the screwing impression possibly provided instead of the barrel.

As seen clearly in FIGS. 3 and 4, the member 12 is interposed between the legs 13 and 14 of the U-shaped element 11 and includes a portion 23 slidingly mounted on the leg 14 and terminating in a bent portion 24 against which the plate 16 abuts and bears resiliently. More precisely, the bent end 24 is constituted by a first portion 25 substantially perpendicular to the sliding portion 23 and substantially parallel to the base 15 of the U-shaped element 11, which first portion terminates in a bent end portion 26 which, as seen in FIG. 4, is substantially parallel to the plate 16 which bears thereon. At 27 are shown ribs or the like which advantageously stiffen the bent end 24 of the member 12.

The portion 23 of this member is provided with an opening 28 allowing the passage of the screw V, as will be seen later in connection with the operation of the device. Lanced portions are provided in the sliding portion 23, on either side of the opening 28, to form tongues 29 and 30 projecting towards the underside of the portion 23, i.e. towards the leg 14 of the U-shaped part 11. The tongues 29 and 30 are intended to co-operate with the edge 22a of the opening 22 of the leg 14. It will be noted here that both tongues 29 and 30 extend in the same direction, towards the edge 23a of the sliding portion 23.

The opening 28 provided in this portion is preferably provided with a projecting flange 28a which, in a way, forms an extrusion directed towards the leg 13 of the U-shaped part 11, i.e., towards the interior thereof.

The portion 23 is preferably slightly curved between the edge 23a and the bent end 24 and is provided with downwardly bent edges 31 co-operating with the sides 14a of the leg 14, as seen clearly in FIG. 4. Thus, during its sliding, the member 12 is guided by its portion 23 on the leg 14 of the U-shaped part 11.

It is important to note here that end portion 26 of the bent end 24 extends over a length which is smaller than the distance between the edge 19 of the plate 16 and the base 15 of the U-shaped part 11. This is indispensable for the operation of the nut which will now be described with more particular reference to FIGS. 5 and 6.

Figure 5:
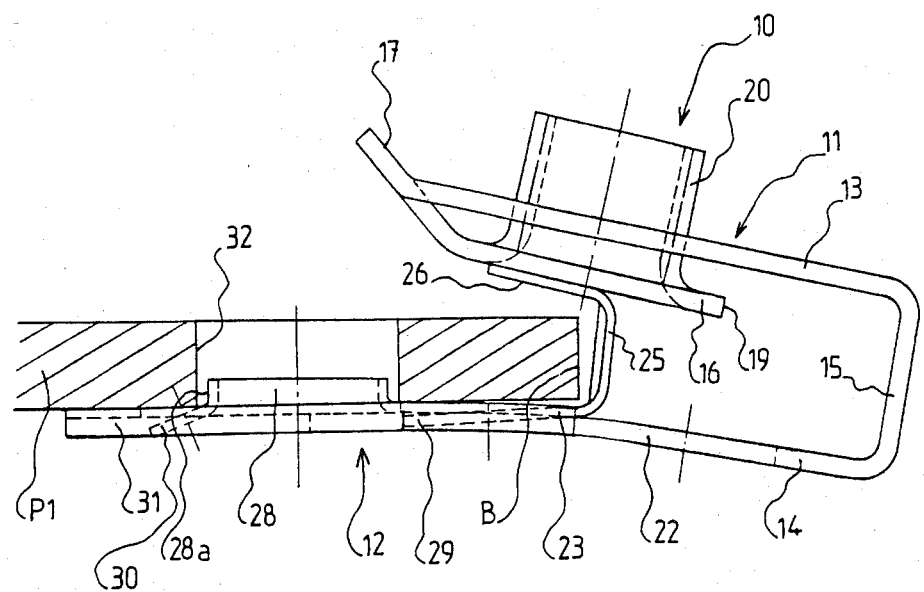
FIG. 5 is an elevational side view of the same nut at the beginning of its fitting onto the edge of a panel.

In the unmounted state, the U-shaped part 11 and the member 12 forming the nut 10 are in the position illustrated in FIGS. 4 and 5. It will be recalled here that the two legs 13 and 14 are held apart by the bent end 25 on which the plate 16 bears resiliently, and it will be noted that the tongue 29 is caught in the edge of the front portion of the oblong opening 22 provided in the leg 14, as seen in FIG. 4. Otherwise stated, the member 12 is caught on the U-shaped part 11 and cannot escape therefrom.

As can be seen in FIG. 5, the nut 10 is first presented in front of the edge B of a panel such as $P_1$ on which the nut is to be mounted. The extruded or projecting portion 28a of the opening 28 of the member 12 is placed and accommodated in an opening 32 provided in the panel $P_1$. In order to mount the nut 10, it is then sufficient to exert a push on the portion 15 of the nut. The bent portion 25 of the member 12 thus comes into abutment against the edge B and, as the push on the portion 15 is continued, the U-shaped part 11 passes onto the panel P₁ by sliding on the member 12 immobilized by the edge B until the portion 26 of the member 12 leaves the edge 19 of the plate 16. At that moment, the leg 13 of the U-shaped part 11 is released and resiliently bears against the upper face of the panel P₁ as is clearly seen in FIG. 6.

It should be noted here that the portion 26 of the element 12 is located between the edge 19 of the plate 16 and the portion 15 of the U-shaped part 11, and that the internally-threaded barrel 20, the hole 32 of the panel P₁, the opening 28 of the member 12 and the opening 22 of the leg 14 are aligned, which, as is readily understood, allows the passage and introduction of the screw V which can be screwed into the internally-threaded barrel 20 to finally ensure the fastening of a panel P₂ to the panel P₁.

It will be noted that, in this mounted position, the tongue 30 of the member 12 has replaced the tongue 29 and is caught in the edge 22a of the opening 22 provided in the leg 14 of the U-shaped part 11. This replacement takes place after the relative sliding of the member 12 in the U formed by the part 11.

It will be observed that, in the case of a panel P₁ of very small thickness (which is not the case in FIGS. 5 and 6), the extrusion 28a constituting the flange of the opening 28 of the member 12 may advantageously slightly fit into the opening of the internally-threaded barrel 20, thus advantageosuly protecting the edge of the hole 32 of the panel P₁ from various attacks such as those caused by corrosion or by the screw thread.

There is therefore obtained, according to the invention, a clip nut which requires no mounting effort, since the clip is initially held open, which obviates any risk of scratching or of chip formation on the panel on which it is mounted, which can be used for various panel thicknesses with the same efficiency owing particularly to the curvature of the member 12, and which can be perfectly and very accurately positioned on the panel owing to the extrusion 28a constituting the edge of the opening 28 provided in the member 12 interposed between the legs 13 and 14, which member, owing to the tongues 29 and 30, will always be positively held both before and after the mounting of the nut.

Of course, the invention is by no means limited to the forms of embodiment described and illustrated which have been given by way of example only.

Indeed, the device of the invention may or may not constitute a nut. In the first case, the internally-threaded portion for the screwing may assume any shape. In the second case, i.e., if the device does not constitute a nut, the clip device merely constitutes for example a U-shaped steel spring, one of the legs of which may not be provided with a plate, in which case it co-operates directly with the member interposed between the legs of the U-shaped clip, or, alternatively, one of the legs of the U-shaped clip may be provided with such a plate which, in this case, co-operates with the said member.

Also, whether the device of the invention does or does not constitute a nut, it is capable of multiple applications for fastening together any objects or parts.

The invention therefore includes all technical equivalents to the means described as well as their combinations if the latter are carried out according to its gist.

What is claimed is:

1. A fastening clip device comprising
    a resiliently deformable, substantially U-shaped element having a base and two legs,
    a fitting member for fitting said U-shaped element onto an edge of an object by being interposed between said two legs so as to hold said legs apart prior to fitting onto the object edge, and being movable relative to said legs so as to be displaceable under action of the object as said legs pass over edge surfaces of the object, and
    means provided on at least one of said two legs for releasing said legs at the end of the displacement of said fitting member in a vicinity of said base, to allow said legs to close onto the object edge.

2. The device of claim 1, wherein said fitting member comprises
    a portion for sliding on one of said two legs, and
    a bent end portion, formed by an end of said sliding portion, and on which the other of said two legs bears.

3. A device according to claim 2, wherein said sliding portion is slightly curved and is provided with downwardly turned edges co-operating with sides of the one of said two legs.

4. A device according to claim 2, wherein said bent end portion of said fitting member is constituted by a first portion substantially perpendicular to said sliding portion and substantially parallel to said base of said U-shaped element and a following end portion substantially parallel to the other of said two legs.

5. A device according to claim 4, wherein said first portion of said bent end portion of said fitting member is provided with stiffening ribs.

6. A device according to claim 1, wherein one of said two legs includes a partially stamped out and deformed portion forming a plate which is integral with a free end of said stamped out leg, which extends inwardly from said U shaped element and which resiliently bears upon said member.

7. A device according to claim 6, wherein said plate is provided with an opening for receiving a screw and constituted by an internally threaded barrel portion, and the other of said two legs is provided with an opening allowing the passage of the screw which also passes through a hole provided in the edge of the object which is a panel, when the panel is in inserted position between said two legs.

8. The device of claim 7, wherein said fitting member additionally comprises an opening for the passage of the screw therethrough.

9. A device according to claim 8, additionally comprising
    a pair of lanced tongues formed on opposite sides of said opening made in said fitting member, said lanced tongues projecting from said fitting member and co-operating with edges of said opening provided in the other of said two legs.

10. A device according to claim 8, additionally comprising
    a flange provided in said opening made in said fitting member, said flange projecting inwardly from said U-shaped element.

11. The device of claim 7, wherein said fitting member comprises
    a portion for sliding on the other of said two legs,
    a bent portion connected to said sliding portion and substantially perpendicular to said sliding portion and substantially parallel to said base of said U-shaped element, and an end portion connected to said bent portion and substantially parallel to said plate, said plate bearing thereon.

12. A device according to claim 11, wherein said end portion is of a length smaller than a distance between a free end edge of said plate which is opposite the free end of said stamped-out leg and said base of said U-shaped element.

13. The device of claim 11, wherein said sliding portion of said fitting member comprises an opening for the passage of a screw therethrough and two lanced tongues provided on opposite sides of said sliding portion opening, and co-operating with edges of said opening in the other of said two legs.

14. The device of claim 13, additionally comprising a flange provided in said sliding portion opening which projects inwardly from said U-shaped element.

* * * * *